(12) United States Patent
Chou et al.

(10) Patent No.: US 10,460,241 B2
(45) Date of Patent: Oct. 29, 2019

(54) SERVER AND CLOUD COMPUTING RESOURCE OPTIMIZATION METHOD THEREOF FOR CLOUD BIG DATA COMPUTING ARCHITECTURE

(71) Applicant: Institute For Information Industry, Taipei (TW)

(72) Inventors: Jerry Chi-Yuan Chou, Hsinchu (TW); Shih-Yu Lu, Nantou County (TW); Chen-Chun Chen, Taoyuan (TW); Chan-Yi Lin, Taipei (TW); Hsin-Tse Lu, Taipei (TW)

(73) Assignee: Institute For Information Industry, Taipei (TW)

( * ) Notice: Subject to any disclaimer, the term of this patent is extended or adjusted under 35 U.S.C. 154(b) by 558 days.

(21) Appl. No.: 15/372,348

(22) Filed: Dec. 7, 2016

(65) Prior Publication Data
US 2018/0144251 A1  May 24, 2018

(30) Foreign Application Priority Data
Nov. 23, 2016  (TW) ............................. 105138406 A

(51) Int. Cl.
*G06N 5/02* (2006.01)
*G06N 7/00* (2006.01)
(Continued)

(52) U.S. Cl.
CPC .............. *G06N 5/02* (2013.01); *G06N 7/005* (2013.01); *G06N 20/00* (2019.01); *H04L 67/10* (2013.01); *H04L 67/32* (2013.01)

(58) Field of Classification Search
CPC .......... G06N 5/02; G06N 7/005; G06N 20/00; H04L 67/10; H04L 67/32
See application file for complete search history.

(56) References Cited

U.S. PATENT DOCUMENTS

| 2013/0007753 A1 | 1/2013 | Jain |
| 2013/0111035 A1* | 5/2013 | Alapati ................. G06F 9/5072 709/226 |

(Continued)

OTHER PUBLICATIONS

Liu et al., "A Speculative Approach to Spatial-Temporal Efficiency with Multi-Objective Optimization in a Heterogeneous Environment," in 9 Security Comm. Networks 4002-4012 (2016). (Year: 2016).*

(Continued)

*Primary Examiner* — Kamran Afshar
*Assistant Examiner* — Ryan C Vaughn
(74) *Attorney, Agent, or Firm* — Skaar Ulbrich Macari, P.A.

(57) ABSTRACT

A server and a cloud computing resource optimization method thereof for big data cloud computing architecture are provided. The server runs a dynamic scaling system to perform the following operations: receiving a task message; executing a profiling procedure to generate a profile based on an to-be-executed task recorded in the task message; executing a classifying procedure to determine a task classification of the to-be-executed task; executing a prediction procedure to obtain a plurality of predicted execution times corresponding to a plurality of computing node numbers, a computing node type and a system parameter of the to-be-executed task; executing an optimization procedure to determine a practical computing node number of the to-be-executed task; and transmitting an optimization output message to a management server to make the management server allocate at least one data computing system to execute a program file of the to-be-executed task.

22 Claims, 10 Drawing Sheets

(51) Int. Cl.
*H04L 29/08* (2006.01)
*G06N 20/00* (2019.01)

(56) References Cited

U.S. PATENT DOCUMENTS

| | | | |
|---|---|---|---|
| 2013/0254196 A1 | 9/2013 | Babu et al. | |
| 2014/0201371 A1* | 7/2014 | Gupta | G06F 9/45558 709/226 |
| 2015/0242234 A1* | 8/2015 | Harris | G06F 9/4856 718/1 |
| 2018/0060128 A1* | 3/2018 | Liu | G06F 9/4881 |

OTHER PUBLICATIONS

Kambatla et al., "Towards Optimizing Hadoop Provisioning in the Cloud," in 9.12 HotCloud 28-30 (2009). (Year: 2009).*

Krishnaveni et al., "Survey on Dynamic Resource Allocation Strategy in Cloud Computing Environment," in 2.6 Intl. J. Comp. Applications Technology and Res. 731-737 (2013). (Year: 2013).*

Luo et al., "A Resource Scheduling Algorithm of Cloud Computing based on Energy Efficient Optimization Methods," in 2012 Intl. Green Computing Conf. 1-6 (2012). (Year: 2012).*

Song et al., "A Hadoop MapReduce Performance Prediction Method," in 2013 IEEE 10th Intl. Conf. on High Performance Computing and Comms. 820-825 (2013). (Year: 2013).*

Tang et al., "An Optimized MapReduce Workflow Scheduling Algorithm for Heterogeneous Computing," in 72 J. Supercomputing 2059-2079 (2016). (Year: 2016).*

Wang et al., "Performance Prediction for Apache Spark Platform," in 2015 IEEE Intl. Conf. on High Performance Computing and Comms. 166-173 (2015). (Year: 2015).*

Wu et al., "A Self-Tuning System based on Application Profiling and Performance Analysis for Optimizing Hadoop MapReduce Cluster Configuration," in 20th Annual Intl. Conf. on High Performance Computing 89-98 (2013). (Year: 2013).*

Ferguson, Andrew D.; Bodik, Peter; Kandula, Srikanth; Boutin, Eric; Fonseca, Rodrigo. Jockey: Guaranteed Job Latency in Data Parallel Clusters; EuroSys'12, Apr. 10-13, 2012, Bern, Switzerland; 14 pages.

Verma, Abhishek; Cherkasova, Ludmila; Campbell, Roy H. Aria: Automatic Resource Inference and Allocation for MapReduce Environments; ICAC'11, Jun. 14-18, 2011, Karlsruhe, Germany; 10 pages.

Chen, Keke; Powers, James; Guo, Shumin; Tian, Fengguang. CRESP: Towards Optimal Resource Provisioning for MapReduce Computing in Public Clouds; IEEE 2013; 11 pages.

* cited by examiner

|  Vi / N | V1=2 | V2=1 | V3=4 |
|---|---|---|---|
| 0 | 0 | 0 | 0 |
| 1 | 2/4 | 1/4 | 4/6 |
| 2 | 2/2 | 1/3 | 4/3 |
| 3 | 2/1 | 1/2 | 4/1 |

Task 1 → column V1=2; Task 2 → column V2=1; Task 3 → column V3=4

FIG. 4

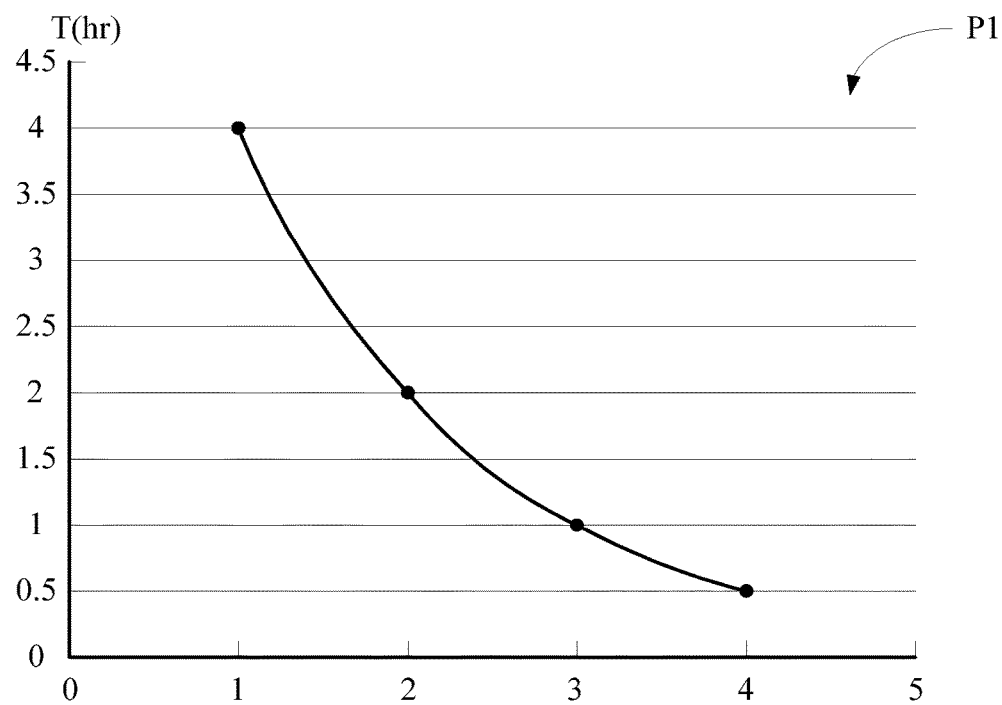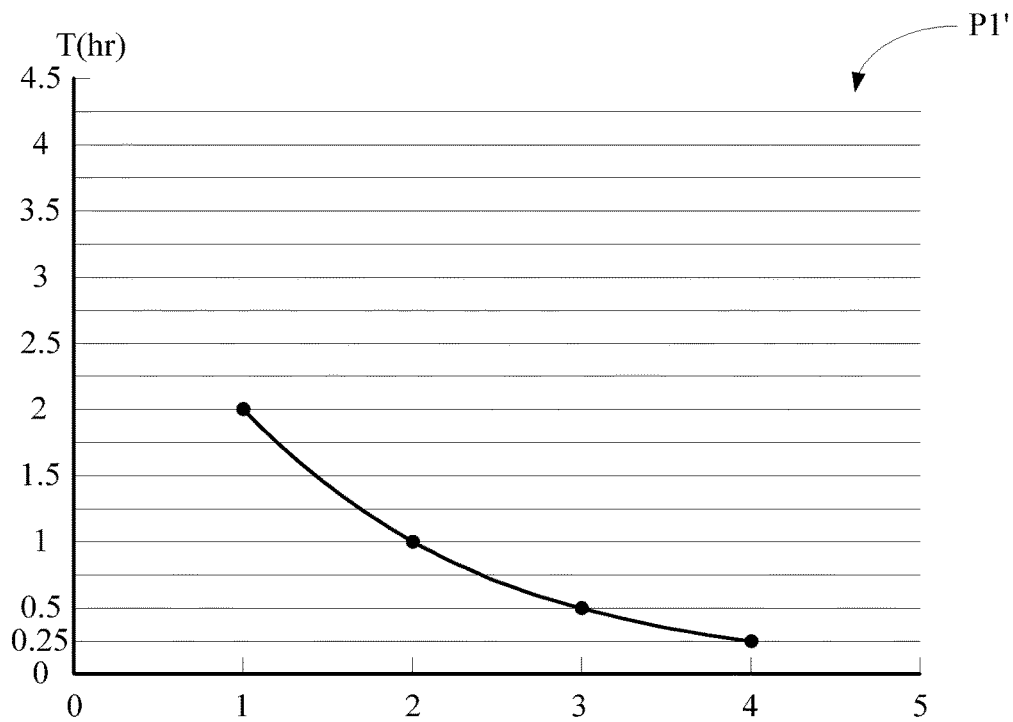
FIG. 6

Based on a classification model, comparing the profile with the classification model to determine a task classification of the to-be-executed task — S901

FIG. 9

Based on a computing node type and a system parameter recorded in a prediction sub-model corresponding to the task classification in a prediction model, assigning the computing node type and the system parameter to the to-be-executed task — S1001

Generating an execution time prediction curve of the to-be-executed task based on the prediction sub-model and according to the task classification and the profile to obtain a plurality of predicted execution times of the to-be-executed task corresponding to a plurality of computing node numbers — S1003

FIG. 10

SERVER AND CLOUD COMPUTING RESOURCE OPTIMIZATION METHOD THEREOF FOR CLOUD BIG DATA COMPUTING ARCHITECTURE

PRIORITY

This application claims priority to Taiwan Patent Application No. 105138406 filed on Nov. 23, 2016, which is hereby incorporated by reference in its entirety.

FIELD

The present invention relates to a server and a cloud computing resource optimization method thereof for big data cloud computing architecture. Specifically, the server of the present invention runs a dynamic scaling system for executing a profiling procedure, a classifying procedure, a prediction procedure and an optimization procedure to determine a practical computing node number, a computing node type and a system parameter of a to-be-executed task.

BACKGROUND

With advancement of the science and technologies, many cloud service providers (e.g., AMAZON®, GOOGLE®, VMWARE®, MICROSOFT® etc.) now provide cloud computing services, and allocate virtual hosts to users to process data to meet the users' needs. The cloud computing services may adopt the HADOOP® computing framework, the SPARK™ computing framework or multiple kinds of other cloud computing frameworks to provide platforms for processing big data computation. Under such public cloud service architectures, most of the cloud service providers have sufficient hardware resources to provide almost infinite computing resources. Therefore, when the complexity of a program to be executed by a user increases or the data amount to be processed increases, the users may adjust or set by themselves the number of virtual hosts needed and system parameters (i.e., hardware and software configurations) thereof to satisfy their own need.

However, the adjustment or setting of the number of virtual hosts or system parameters thereof are determined by the users themselves by experience instead of being determined through effectively analyzing the complexity of the program to be executed and the data amount to be processed, and the current cloud service providers have not provided such an analyzing service. Moreover, if limitation of the computing resources (i.e., there is a limitation on settings of the number of virtual hosts and system parameters thereof) is taken into consideration, adjusting or setting the number of virtual hosts and system parameters thereof by the users themselves will cause unfairness in allocation of the limited resources and make it impossible to optimize use of the limited resources, thus degrading the overall efficiency of the computing system.

Accordingly, an urgent need exists in the art to provide a cloud computing resource optimization mechanism that can automatically allocate computing resources and add or delete virtual hosts under conditions of limited computing resources to optimize use of the limited computing resources.

SUMMARY

The disclosure includes a cloud computing resource optimization mechanism, which runs a dynamic scaling system in a big data cloud computing architecture to perform profile analysis on a to-be-executed task recorded in a task message. Then, the dynamic scaling system classifies the to-be-executed task according to the profile analysis result, and assigns a computing node type and a system parameter of the to-be-executed task and predicts a plurality of predicted execution times of the to-be-executed task corresponding to a plurality of computing node numbers according to the classification result.

Then the dynamic scaling system determines a practical computing node number of the to-be-executed task according to a user-defined attribute and the predicted execution times of the to-be-executed task, an additional user-defined attribute and a plurality of additional predicted execution times of each of at least one additional task and the maximum computing resource of the big data cloud computing architecture. Afterwards, the dynamic scaling system provides the practical computing node number, the computing node type and the system parameter of the to-be-executed task to a management server of the big data cloud computing architecture so that appropriate computing resources are allocated to the to-be-executed task.

Accordingly, the cloud computing resource optimization mechanism can be applied to big data cloud computing architectures adopting various cloud computing frameworks (e.g., the HADOOP® computing framework and the SPARK™ computing framework) so as to optimize use of the limited computing resources by automatically allocating computing resources and adding or deleting virtual hosts under conditions of limited computing resources. Thereby, unfairness in allocation of the limited resources or degradation in overall efficiency of the computing system due to adjustment or setting of the number of virtual hosts and system parameters thereof by the users themselves is avoided.

The disclosure also includes a server for big data cloud computing architecture. The server comprises a transceiver and a processor. The transceiver is connected to a network. The processor is electrically connected to the transceiver, and is configured to run a dynamic scaling system to receive a task message via the transceiver. The task message records a user-defined attribute, a program file and a plurality of data files of a to-be-executed task. The program file and the data files are stored in a data storage system which runs in a data storage server assembly in the big data cloud computing architecture. The dynamic scaling system further operates to execute a profiling procedure that comprises the following steps of: sampling the data files recorded in the task message to choose a plurality of sampled data files and to generate an advance execution message which records the sampled data files and the program file of the to-be-executed task; transmitting the advance execution message to a big data computing server assembly of the big data cloud computing architecture via the transceiver so that a sampled data computing system running in the big data computing server assembly executes the program file on the sampled data files and generates a profile according to an execution result of the program file; and receiving the profile from the big data computing server assembly via the transceiver. Then, the dynamic scaling system further operates to execute a classifying procedure that comprises the following step of: based on a classification model, comparing the profile with the classification model to determine a task classification of the to-be-executed task. Next, the dynamic scaling system further operates to execute a prediction procedure that comprises the following steps of: based on a computing node type and a system parameter recorded in a prediction sub-model corresponding to the task classification in a prediction model, assigning the computing node type and the system parameter to the to-be-executed task; and based on the prediction sub-model, generate an execution time prediction curve of the to-be-executed task according to the task classification and the profile to obtain a plurality of predicted execution times of the to-be-executed task corresponding to a plurality of computing node numbers, the computing node numbers corresponding to the predicted execution times in one-to-one correspondence. Then, the dynamic scaling system further operates to execute an optimization procedure that comprises the following steps of: determining whether there is at least one additional task; when the at least one additional task exists, determining a practical computing node number of the to-be-executed task according to the user-defined attribute and the predicted execution times of the to-be-executed task, an additional user-defined attribute and a plurality of additional predicted execution times of each of the at least one additional task, and a maximum computing resource of the big data computing server assembly; and generating an optimization output message, which records the program file, the data files, the practical computing node number, the computing node type and the system parameter of the to-be-executed task. The dynamic scaling system further operates to transmit the optimization output message to a management server of the big data cloud computing architecture via the transceiver so that a management system run by the management server allocates at least one data computing system running in the big data computing server assembly to execute the program file on the data files of the to-be-executed task according to the optimization output message, wherein the number of the at least one data computing system is equal to the practical computing node number.

The disclosure further includes a cloud computing resource optimization method of a server for big data cloud computing architecture. The server comprises a transceiver and a processor. The transceiver is connected to a network. The processor is electrically connected to the transceiver to run a dynamic scaling system to execute the cloud computing resource optimization method. The cloud computing resource optimization method comprises the following step of: receiving a task message via the transceiver. The task message records a user-defined attribute, a program file and a plurality of data files of a to-be-executed task. The program file and the data files are stored in a data storage system running in a data storage server assembly of the big data cloud computing architecture. The cloud computing resource optimization method further comprises the following step of executing a profiling procedure that comprises the following steps of: sampling the data files recorded in the task message to choose a plurality of sampled data files and to generate an advance execution message which records the sampled data files and the program file of the to-be-executed task; transmitting the advance execution message to a big data computing server assembly of the big data cloud computing architecture via the transceiver so that a sampled data computing system running in the big data computing server assembly executes the program file on the sampled data files and generates a profile according to an execution result of the program file; and receiving the profile from the big data computing server assembly via the transceiver. The cloud computing resource optimization method further comprises the following step of executing a classifying procedure that comprises the following step of: based on a classification model, comparing the profile with the classification model to determine a task classification of the to-be-executed task. The cloud computing resource optimization method further comprises the following step of executing a prediction procedure that comprises the following steps of: based on a computing node type and a system parameter recorded in a prediction sub-model corresponding to the task classification in a prediction model, assigning the computing node type and the system parameter to the to-be-executed task; and based on the prediction sub-model, generating an execution time prediction curve of the to-be-executed task according to the task classification and the profile to obtain a plurality of predicted execution times of the to-be-executed task corresponding to a plurality of computing node numbers, the computing node numbers corresponding to the predicted execution times in one-to-one correspondence. The cloud computing resource optimization method further comprises the following step of executing an optimization procedure that comprises the following steps of: determining whether there is at least one additional task; when the at least one additional task exists, determining a practical computing node number of the to-be-executed task according to the user-defined attribute and the predicted execution times of the to-be-executed task, an additional user-defined attribute and a plurality of additional predicted execution times of each of the at least one additional task, and a maximum computing resource of the big data computing server assembly; generating an optimization output message, which records the program file, the data files, the practical computing node number, the computing node type and the system parameter of the to-be-executed task. The cloud computing resource optimization method further comprises the following step of: transmitting the optimization output message to a management server of the big data cloud computing architecture via the transceiver so that a management system run by the management server allocates at least one data computing system running in the big data computing server assembly to execute the program file on the data files of the to-be-executed task according to the optimization output message, wherein the number of the at least one data computing system is equal to the practical computing node number.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 4 is a schematic view illustrating calculation of ratios in an optimization procedure according to the present invention;

FIG. 6 depicts updating of an execution time prediction curve of a task by a monitoring procedure according to the present invention; and FIGS. 7 to 11 are flowchart diagrams of a cloud computing resource optimization method according to the present invention.

DETAILED DESCRIPTION

In the following description, the present invention will be explained with reference to example embodiments thereof. However, these example embodiments are not intended to limit the present invention to any specific examples, embodiments, environment, applications or particular implementations described in these example embodiments. Therefore, description of these example embodiments is only for purpose of illustration rather than to limit the present invention.

It should be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
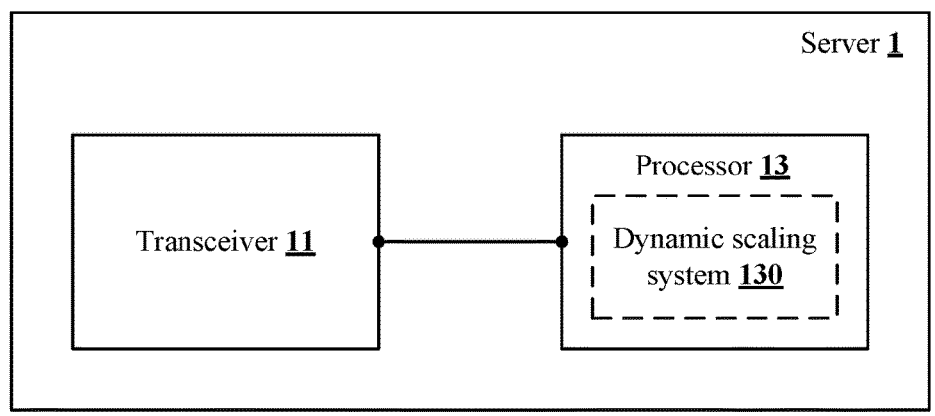
FIG. 1 is a schematic view of a server 1 according to the present invention.
Figure 2:
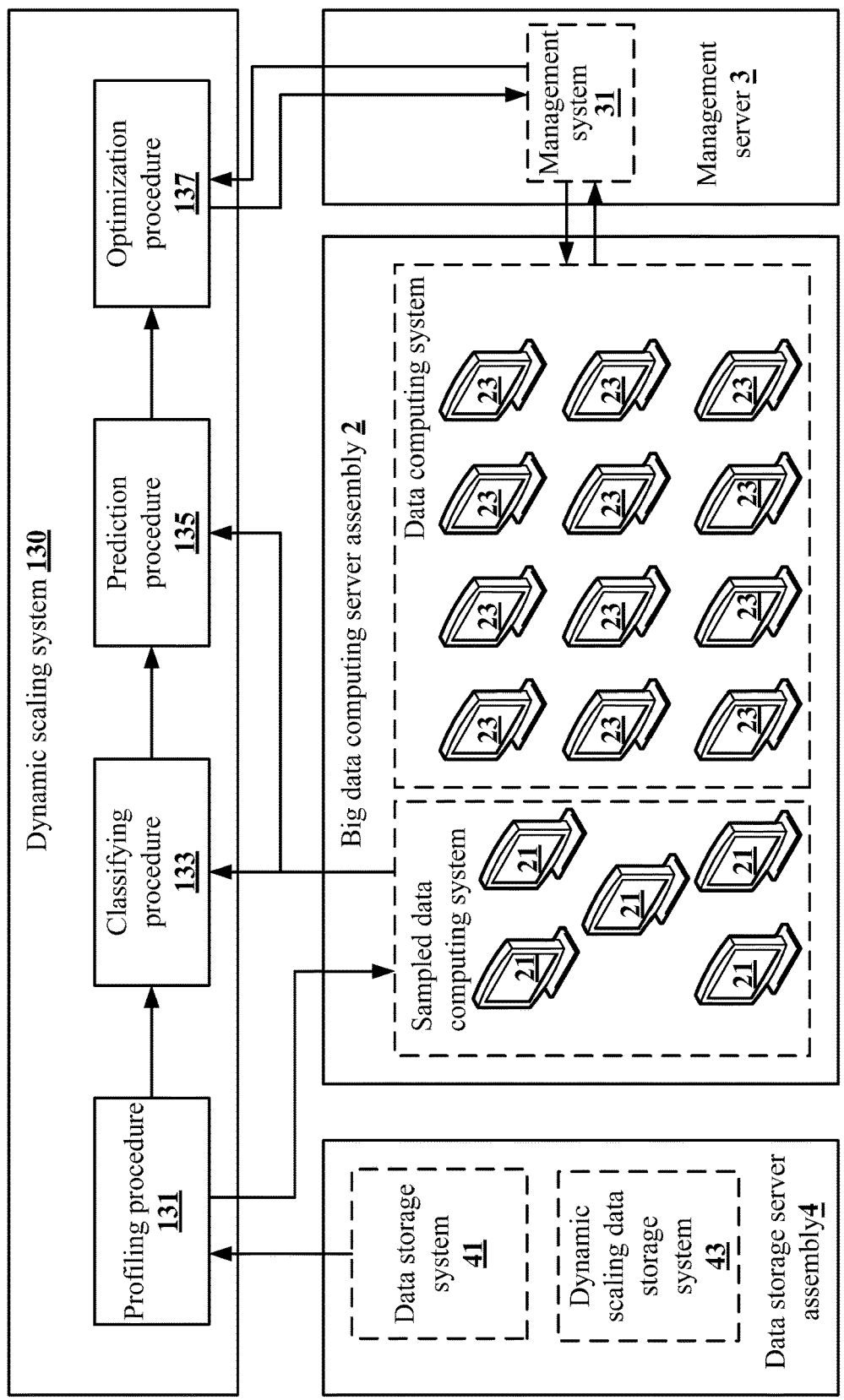
FIG. 2 depicts an implementation scenario of a big data cloud computing architecture according to the present invention.

A first embodiment of the present invention is shown in FIG. 1 to FIG. 4. FIG. 1 is a schematic view of a server 1 according to the present invention. The server 1 comprises a transceiver 11 and a processor 13. The transceiver 11 is connected to a network, e.g., the Internet, a local area network (LAN), a telecommunication network, or a combination thereof. The processor 13 is electrically connected to the transceiver 11 and is configured to run a dynamic scaling system 130 to receive a task message via the transceiver 11. The task message records a user-defined attribute, a program file and a plurality of data files of a to-be-executed task. The program file and the data files is stored in a data storage system 41 which runs in a data storage server assembly 4 in the big data cloud computing architecture, as shown in FIG. 2.

As shown in FIG. 2, the dynamic scaling system 130 further operates to execute a profiling procedure 131. In the profiling procedure 131, the dynamic scaling system 130 first samples the data files recorded in the task message to choose a plurality of sampled data files and to generate an advance execution message. The advance execution message records the sampled data files and the program file of the to-be-executed task. The sampled data files are used to evaluate resources and time necessary for operations of the to-be-executed task.

Then, the dynamic scaling system 130 operates to transmit the advance execution message to a big data computing server assembly 2 of the big data cloud computing architecture via the transceiver 11 so that a sampled data computing system 21 running in the big data computing server assembly 2 executes the program file on the sampled data files and generates a profile according to an execution result of the program file. Next, the dynamic scaling system 130 further operates to receive the profile from the big data computing server assembly 2 via the transceiver 11. The profile of the to-be-executed task comprises program file parse data, a sampled task log and a system resource usage record.

It shall be appreciated that, in this embodiment, each sampled data computing system (computing node) 21 is a virtual host in the big data computing server assembly 2. Each computing node is allocated a shared physical hardware resource, e.g., a memory capacity, a number of processor cores, a hard disk capacity, a number of graphic processors etc. However, each sampled data computing system (computing node) 21 may also be a physical machine in the big data computing server assembly 2 in other embodiments.

For example, after the big data computing server assembly 2 receives the advance execution message, it executes the program file on the sampled data files by the computing nodes (i.e., the sampled data computing system 21) of the HADOOP® computing framework, the SPARK™ computing framework or the like computing framework Next, the big data computing server assembly 2 records application interfaces called during execution of the program file, results generated from inputting the sampled data files, the time at which each sampled data file is executed, kinds of system resources used, contents stored in each catalog (e.g., the app catalog, the framework catalog and the logs catalog) and so on as the execution result of the program file, and organizes a part of the execution result into the profile. Accordingly, the profile of the to-be-executed task includes the program file parse data (e.g., the application interfaces called during execution of the program file), the sampled task log (e.g., the time at which each sampled data file is executed) and the system resource usage record (e.g., the system resource amount used).

It shall be appreciated that, in other embodiments, the present invention may further take the data amount that needs to be processed in the to-be-executed task into consideration. In this case, the dynamic scaling system 130 determines a file size of the data files of the to-be-executed task first before executing the profiling procedure 131, and executes the profiling procedure 131 only when the file size of the data files is greater than a threshold. Conversely, if the file size of the data files is equal to or smaller than the threshold, the dynamic scaling system 130 directly assigns the computing node number, the computing node type and the system parameter to the to-be-executed task according to a preset rule defined in the system, and transmits the task information to the management server 3 of the big data cloud computing architecture. In other words, when the file size of the data files of the to-be-executed task is quite small, the execution time needed will be also quite short, so the task can be directly put into the schedule for execution.

Next, the dynamic scaling system 130 further operates to execute a classifying procedure 133. The classifying procedure 133 compares the profile with a classification model to determine a task classification of the to-be-executed task based on the classification model. It shall be appreciated that the classification model has a plurality of standard task classifications, which may be set by the users themselves or generated through training by a machine learning algorithm (e.g., a scaled conjugate gradient algorithm) that adopts a lot of already known tasks as training data (i.e., the classification model is generated by the machine learning algorithm before the dynamic scaling system 130 is on-line). Additionally, after having operated for a period of time, the dynamic scaling system 130 may further use a clustering algorithm (e.g., the K-means clustering method) to modify these standard task classifications according to profiles already executed so that the number of the standard task classifications can be increased or decreased to make subsequent task features be distinguished more accurately by the standard task classifications.

Afterwards, the dynamic scaling system 130 further operates to execute a prediction procedure 135. After the task classification to which the to-be-executed task belongs is determined, the prediction procedure 135 assigns a computing node type and a system parameter recorded in a prediction sub-model corresponding to the task classification in a prediction model to the to-be-executed task, and generates an execution time prediction curve (e.g., the execution time prediction curve P1) of the to-be-executed task based on the prediction sub-model and according to the task classification and the profile to obtain a plurality of predicted execution times of the to-be-executed task corresponding to a plurality of computing node numbers. The computing node numbers correspond to the predicted execution times in one-to-one correspondence.

In detail, each prediction sub-model in the prediction model records a computing node type and a system parameter that correspond to a standard task classification in the classification model. Accordingly, once the task classification of the to-be-executed task is determined, the prediction procedure 135 can assign the computing node type and the system parameter to the to-be-executed task according to the task classification and the profile of the to-be-executed task, and generate an execution time prediction curve of the to-be-executed task to evaluate the execution time needed when the to-be-executed task is executed by using each computing node number.

It shall be appreciated that, in this embodiment, each data computing system (computing node) 23 is a virtual host in the big data computing server assembly 2. Each computing node is allocated different hardware resources, e.g., a memory capacity, a number of processor cores, a hard disk capacity and a number of graphic processors etc. Different computing nodes represent that they have different hardware resources, for example, the computing nodes are divided into S-sized nodes, M-sized nodes, L-sized nodes, XL-sized nodes and so on.

The management server 3 may generate computing nodes to meet the needs of different to-be-executed tasks according to their computing node. Additionally, the system parameter of each computing node may include "number of reducer", "memory buffer size" and so on (i.e., parameters that are settable and adjustable in the HADOOP® and SPARK™ systems). The computing node type and the system parameter assigned to the to-be-executed task remain unchanged after the to-be-executed task has been executed. Because setting of the computing node type and the system parameter can be appreciated by those of ordinary skill in the art from the above description of the embodiment of the present invention, it will not be further described herein.

In other embodiments, each data computing system (computing node) 23 may also be a physical host in the big data computing server assembly 2. However, because how the cloud computing resource optimization mechanism is applied to the implementation where each data computing node is a physical host can be appreciated by those of ordinary skill in the art from the above description of the embodiment of the present invention, it will not be further described herein.

Figure 3:
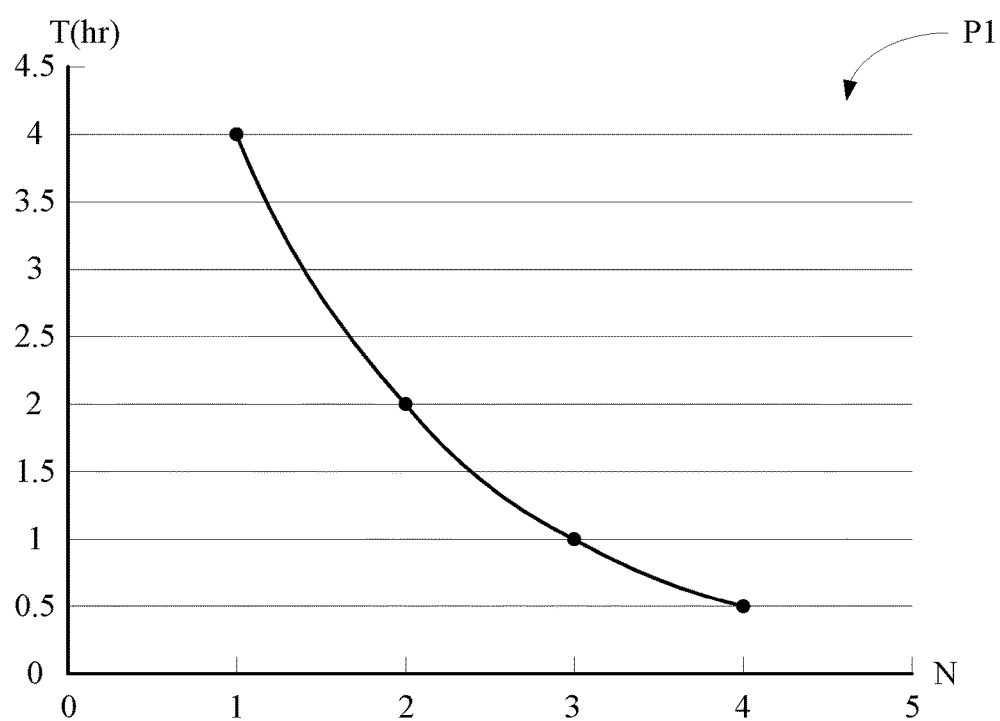
FIG. 3 depicts an execution time prediction curve of a task according to the present invention.

Taking the execution time prediction curve P1 of the to-be-executed task as an example, please refer to FIG. 3. In FIG. 3, the horizontal axis represents the computing node number N and the longitudinal axis represents the predicted execution time T. In the prediction procedure 135, the dynamic scaling system 130 inputs the profile of the to-be-executed task into the prediction sub-models corresponding to its task classification and derives the execution time prediction curve P1 of the to-be-executed task through a linear regression analysis so as to obtain predicted execution times corresponding to execution of the to-be-executed task by using different computing node numbers. For example, it can be seen from FIG. 3 that the predicted execution time of the to-be-executed task is 4 hours if the computing node number is 1, is 2 hours if the computing node number is 2, is 1 hour if the computing node number is 3, and is 0.5 hour if the computing node number is 4.

It shall be appreciated that prediction sub-models in the prediction model may be created by means of a machine learning algorithm (e.g., the multi-layer perception regression algorithm) in which a lot of tasks whose task classifications and profiles have been known are used as training data and the tasks are executed by using different numbers of computing nodes (i.e., computing nodes of the computing node type determined according to the task classification) to obtain practical execution times, thus creating the prediction sub-models. Additionally, after having operated for a period of time, the dynamic scaling system 130 may further re-create the prediction sub-models in the prediction model according to profiles of already executed tasks and modifications of the standard task classifications.

In this embodiment, the sampled data files, the profile, the classification model and the prediction model of the to-be-executed task may be stored in the data storage server assembly 4. The data storage server assembly 4 may further run a dynamic scaling data storage system 43 configured to store various kinds of data used and generated during operation of the dynamic scaling system 130. However, in other embodiments, the server 1 may allocate a specific storage resource of its storage for use by the dynamic scaling system 130 to store the classification model and the prediction model.

The dynamic scaling system 130 further operates to execute an optimization procedure 137. The optimization procedure 137 determines whether there is at least one additional task according to computing resource information (the maximum computing resource of the big data computing server assembly 2) provided by the management system 31 and tasks in the schedule or under execution. When the at least one additional task exists, the optimization procedure 137 operates to determine a practical computing node number of the to-be-executed task according to the user-defined attribute and the predicted execution times of the to-be-executed task, an additional user-defined attribute and a plurality of additional predicted execution times of each of the at least one additional task and a maximum computing resource of the big data computing server assembly 2, and to generate an optimization output message. The optimization output message records the program file, the data files, the practical computing node number, the computing node type and the system parameter of the to-be-executed task.

For example, the user-defined attribute comprises a task execution priority value, a task deadline time, a minimum computing node number and a maximum computing node number. The optimization procedure 137 calculates a task weight value (i.e., a task value) of the to-be-executed task according to the following formula:

$$V = EP \times \frac{D}{D - WT}$$

where V is the task weight value, EP is the task execution priority value and is a positive number, D is the task deadline time of the to-be-executed task, and WT is an execution waiting time.

It shall be appreciated that the task execution priority value may be set by the users themselves, or be set by the system administrator depending on various needs for enterprise management. For example, the system administrator may set the task execution priority values according to job positions of employees, e.g., the task execution priority values being 1 for an assistant, 2 for a section director and 3 for a department director. Additionally, the minimum computing node number and the maximum computing node number may be set by the users themselves, or be set by the system administrator depending on various needs for enterprise management. For example, employees of higher job positions can use a larger number of nodes.

Further in the optimization procedure 137, the dynamic scaling system 130 determines the practical computing node number of the to-be-executed task according to the task weight value and the predicted execution times of the to-be-executed task, an additional task weight value and the additional predicted execution times of each of the at least one additional task, and the maximum computing resource of the big data computing server assembly. For example, the optimization procedure 137 calculates a plurality of ratios between the task weight value of the to-be-executed task and each of the predicted execution times as shown in FIG. 4.

Assume that currently the to-be-executed task is the task 1 having a task weight value V1 of 2 in the table of FIG. 4. Then the ratio thereof (i.e., the value of task per unit time) is 2/4 when the computing node number N is 1 and the predicted execution time is 4 hours, is 2/2 when the computing node number N is 2 and the predicted execution time is 2 hours, and is 2/1 when the computing node number N is 3 and the predicted execution time is 1 hour.

Similarly in the optimization procedure 137, the dynamic scaling system 130 further calculates a plurality of additional ratios between the additional task weight value and each of the additional predicted execution times for each of the additional tasks (e.g., the task 2 and the task 3 shown in FIG. 4, with the task 2 having a task weight value V2 of 1 and the task 3 having a task weight value V3 of 4). Then, the optimization procedure 137 calculates a plurality of sum values between any of the ratios and any of the additional ratios of each of the additional tasks, selects the maximum sum value from among the sum values, and sets the practical computing node number to the computing node number that corresponds to the predicted execution time of the ratio contributing to the maximum sum value.

The optimization procedure 137 calculates the maximum sum value among the sum values of the ratios according to the following formula:

$$\text{maximize} \sum \frac{V_i}{T_i(n_i)}$$

where $V_i$ represents the task weight value of the $i^{th}$ task, $T_i(n_i)$ represents the predicted execution time of the $i^{th}$ task when the computing node number is $n_i$, and $n_i$ of the $i^{th}$ task is a positive integer ranging between the minimum computing node number and the maximum computing node number of the user-defined attribute.

In other embodiments, the optimized output message may further record an additional practical computing node number of each of the at least one additional task when the additional practical computing node number of the at least one additional task is updated. In other words, for each of the at least one additional task, the dynamic scaling system 130 further sets the additional practical computing node number to the additional computing node number that corresponds to the additional predicted execution time of the additional ratio contributing to the maximum sum value and adds it into the optimization output message in the optimization procedure 137. However, in other embodiments, the optimization output message may further record an additional practical computing node number of each of the at least one additional task no matter whether the additional practical computing node number of the additional task is updated or not (i.e., record practical computing node numbers of all to-be-executed tasks and all tasks being currently executed).

For example, please refer to FIG. 4 again. Assume that the maximum computing resource of the big data computing server assembly 2 is 5 computing nodes. It shall be appreciated that, for purpose of simplicity, the task 1, the task 2 and the task 3 are assumed to be of a same task classification in this example, so they have the same computing node type and the management server 3 allocates computing nodes of the same type to the task 1, the task 2 and the task 3. In this case, the maximum computing resource of the big data computing server assembly 2 may be simply represented by the computing node number. However, as will be appreciated by those of ordinary skill in the art, the maximum computing resource of the big data computing server assembly 2 shall actually be represented in units of hardware resources that it can use.

The sum value of the ratios of the task 1, the task 2 and the task 3 is 4.75 when the computing node number of the task 1 is 1, the computing node number of the task 2 is 1 and the computing node number of the task 3 is 3, and is 5 when the computing node number of the task 1 is 2, the computing node number of the task 2 is 0 (i.e., the task 2 is temporarily not executed) and the computing node number of the task 3 is 3. To maximize the total task value, the optimization module 137 selects the maximum sum value of 5 for allocation of the computing resources, and sets the practical computing node number of the task 1 to the computing node number of 2 that corresponds to the 2-hour predicted execution time of the ratio 2/2 of the task 1 and sets the practical computing node number of the task 3 to the computing node number of 3 that corresponds to the 1-hour predicted execution time of the ratio 4/1 of the task 3.

The dynamic scaling system 130 further operates to transmit the optimization output message to a management server 3 of the big data cloud computing architecture via the transceiver 11. Then a management system 31 running in the management server 3 allocates at least one data computing system (computing node) 23 running in the big data computing server assembly 2 to execute the program file on the data files of the to-be-executed task according to the optimization output message, wherein the number of the at least one data computing system (computing node) 23 is equal to the practical computing node number. In the above example, the management server 3 will allocate two computing nodes to execute the task 1 and allocate three computing nodes to execute the task 2.

It shall be appreciated that the management system 31 may conform to the specification of any cloud computing framework, including the extension module/application interface, the resource management module/application interface and so on. However, because the management system 31 of various cloud computing frameworks are well-known in the prior art, it will not be further described herein.

Figure 5:
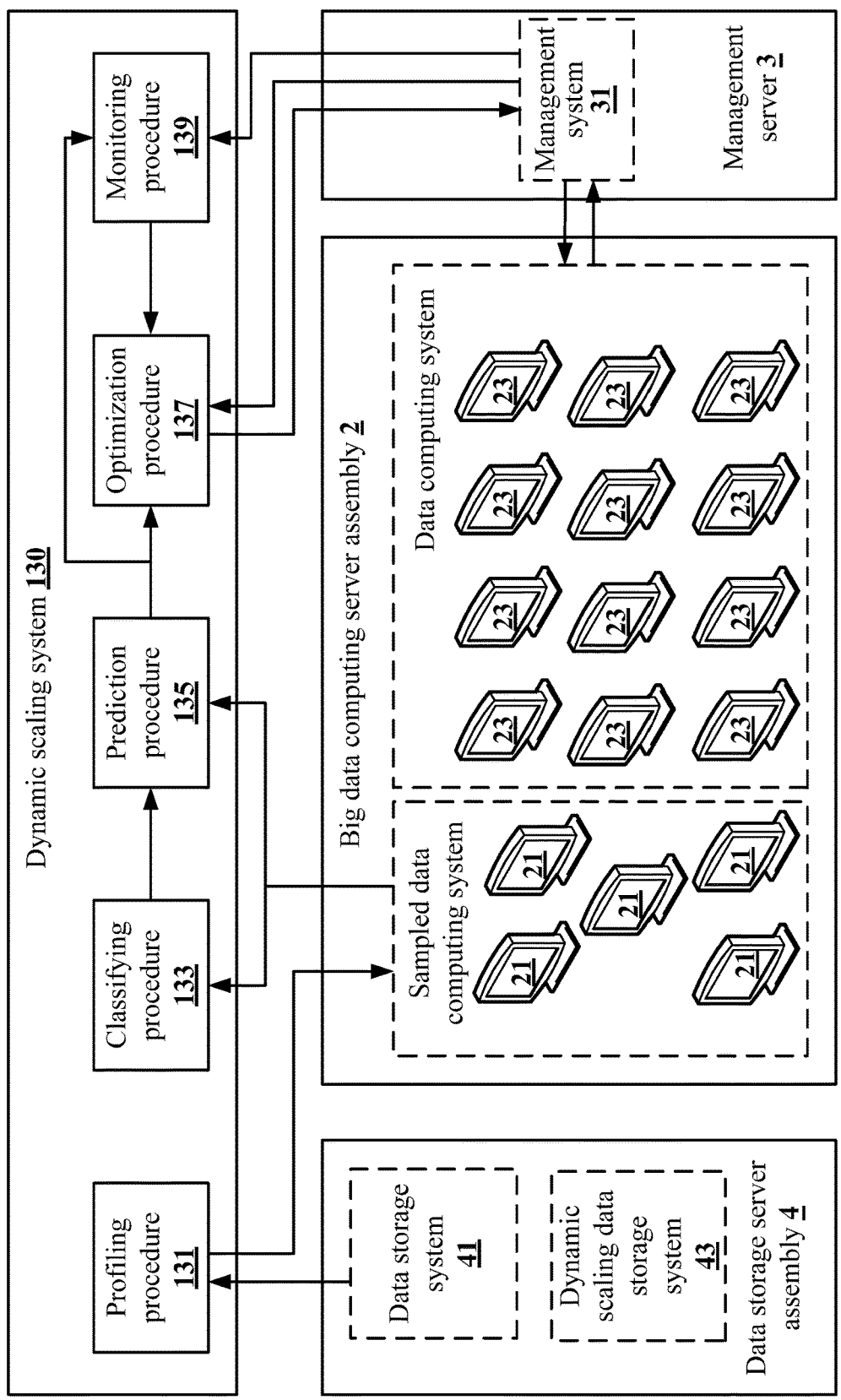
FIG. 5 depicts another implementation scenario of the big data cloud computing architecture according to the present invention.

Please refer to FIG. 5 and FIG. 6 for a second embodiment of the present invention. The second embodiment is an extension of the first embodiment. In this embodiment, the dynamic scaling system 130 operates to execute a monitoring procedure 139. The monitoring procedure 139 updates the execution time prediction curve of the to-be-executed task when the program file of the to-be-executed task is executed by at least one data computing system (computing node) 23.

In detail, when the program file of the to-be-executed task is being executed by at least one data computing system 23, the monitoring procedure 139 is executed to learn the practical execution progress of the to-be-executed task from the management system 31, and to compare the practical execution progress of the to-be-executed task and a predicted execution progress of the to-be-executed task obtained according to the prediction sub-model so as to obtain a deviation value therebetween and to correct the execution time prediction curve according to the deviation value.

Please refer to FIG. 6 as an example for description. As described above, in the execution time prediction curve P1, the predicted execution time of the to-be-executed task is 4 hours when the computing node number of the to-be-executed task is 1 hour, is 2 hours when the computing node number of the to-be-executed task is 2 hours, is 1 hour when the computing node number of the to-be-executed task is 3 hours, and is 0.5 hour when the computing node number of the to-be-executed task is 4 hours. Assuming that the practical computing node number of the to-be-executed task is 2, the predicted execution time of the to-be-executed task shall be 2 hours as learned from the execution time prediction curve P1. However, when the to-be-executed task has been executed halfway, the monitoring procedure 139 determines that the practical execution time will take only 1 hour (i.e., only 50% of the original predicted execution time). Therefore, the monitoring procedure 139 updates the execution time prediction curve P1 into an updated execution time prediction curve P1' to make the execution time prediction curve reflect the practical conditions more closely.

Once the execution time prediction curve is updated, the dynamic scaling system 130 may execute the optimization procedure 137 again to update the practical computing node number of each task. Especially when the practical execution time needed by the task being executed is longer than the predicted execution time, the optimization procedure 137 may determine whether to increase the computing node number for execution of this task. In other words, the optimization procedure 137 may be executed by the dynamic scaling system 130 of the present invention each time a new to-be-executed task is received or any execution time prediction curve is updated so as to re-adjust the practical computing node number of the task continuously.

However, in consideration of the overall system load of the dynamic scaling system 130, the optimization procedure 137 may be executed by the dynamic scaling system 130 periodically (e.g., once every half hour or every hour) or only when the number of new to-be-executed tasks received reaches a preset value in another embodiment. In other words, the conditions to execute the optimization procedure 137 may be determined or adjusted by the system administrator depending on practical system operation conditions, and this also falls within the scope of the present invention.

Figure 7:
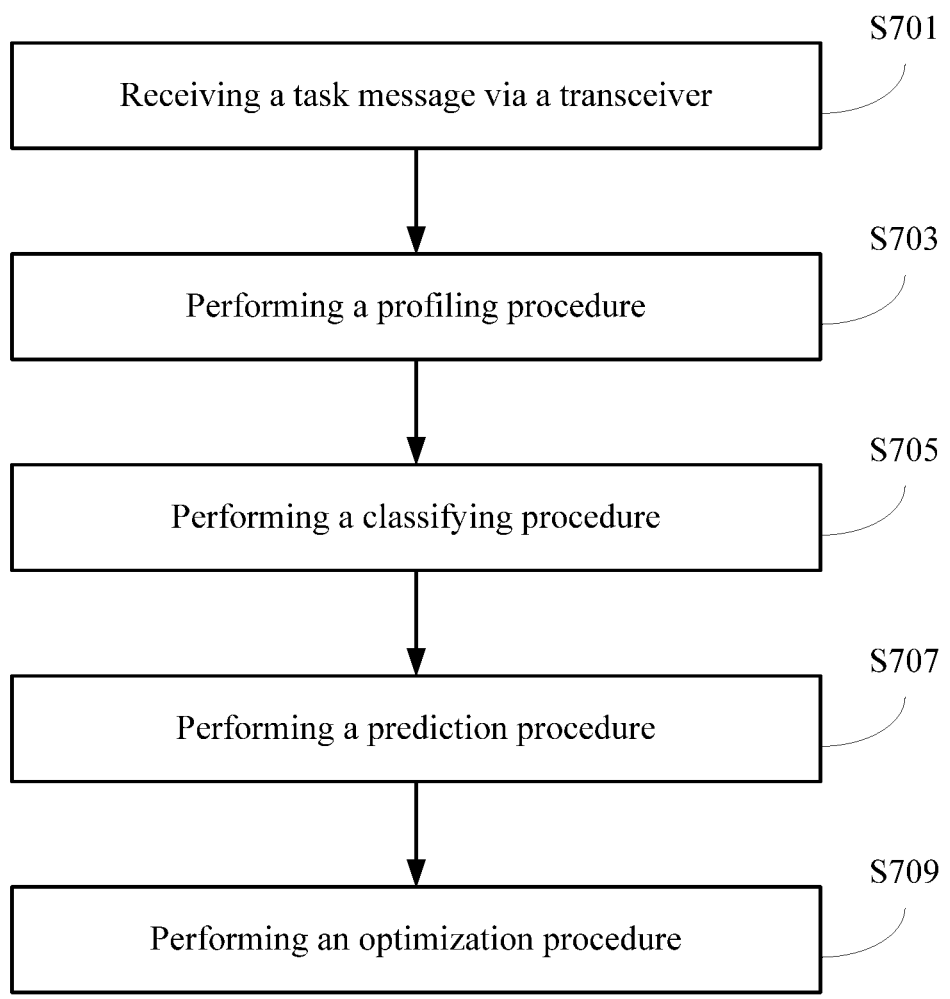

A third embodiment of the present invention is a cloud computing resource optimization method, a flowchart diagram of which is shown in FIG. 7. The cloud computing resource optimization method is adapted for a server (e.g., the server 1 of the aforesaid embodiment) of a big data cloud computing architecture. The server comprises a transceiver and a processor. The transceiver is connected to a network. The processor is electrically connected to the transceiver to run a dynamic scaling system to execute the cloud computing resource optimization method.

First in step S701, a task message is received via the transceiver. The task message records a user-defined attribute, a program file and a plurality of data files of a to-be-executed task. The program file and the data files are stored in a data storage system running in a data storage server assembly of the big data cloud computing architecture.

Figure 8:
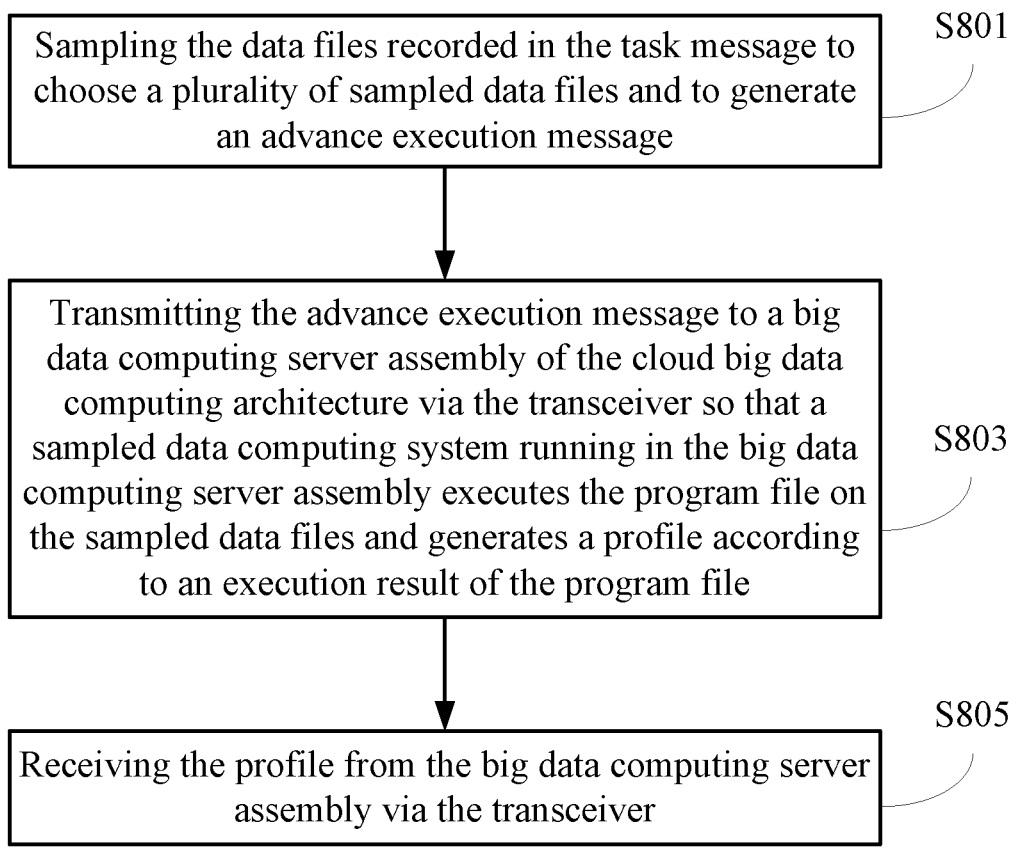

In step S703, a profiling procedure is executed. The profiling procedure comprises the steps shown in FIG. 8. In step S801, the data files recorded in the task message are sampled to choose a plurality of sampled data files and to generate an advance execution message. The advance execution message records the sampled data files and the program file of the to-be-executed task. Then in step S803, the advance execution message is transmitted to a big data computing server assembly of the big data cloud computing architecture via the transceiver so that a sampled data computing system running in the big data computing server assembly executes the program file on the sampled data files and generates a profile according to an execution result of the program file. In step S805, the profile is received from the big data computing server assembly via the transceiver.

Next in step S705, a classifying procedure is executed. The classifying procedure comprises the step shown in FIG. 9. In step S901, based on a classification model, the profile is compared with the classification model to determine a task classification of the to-be-executed task. Then in step S707, a prediction procedure is executed. The prediction procedure comprises the steps shown in FIG. 10. In step S1001, based on a computing node type and a system parameter recorded in a prediction sub-model corresponding to the task classification in a prediction model, the computing node type and the system parameter are assigned to the to-be-executed task. In step S1003, based on the prediction sub-model, a execution time prediction curve of the to-be-executed task is generated according to the task classification and the profile to obtain a plurality of predicted execution times of the to-be-executed task corresponding to a plurality of computing node numbers. The computing node numbers correspond to the predicted execution times in one-to-one correspondence.

Figure 11:
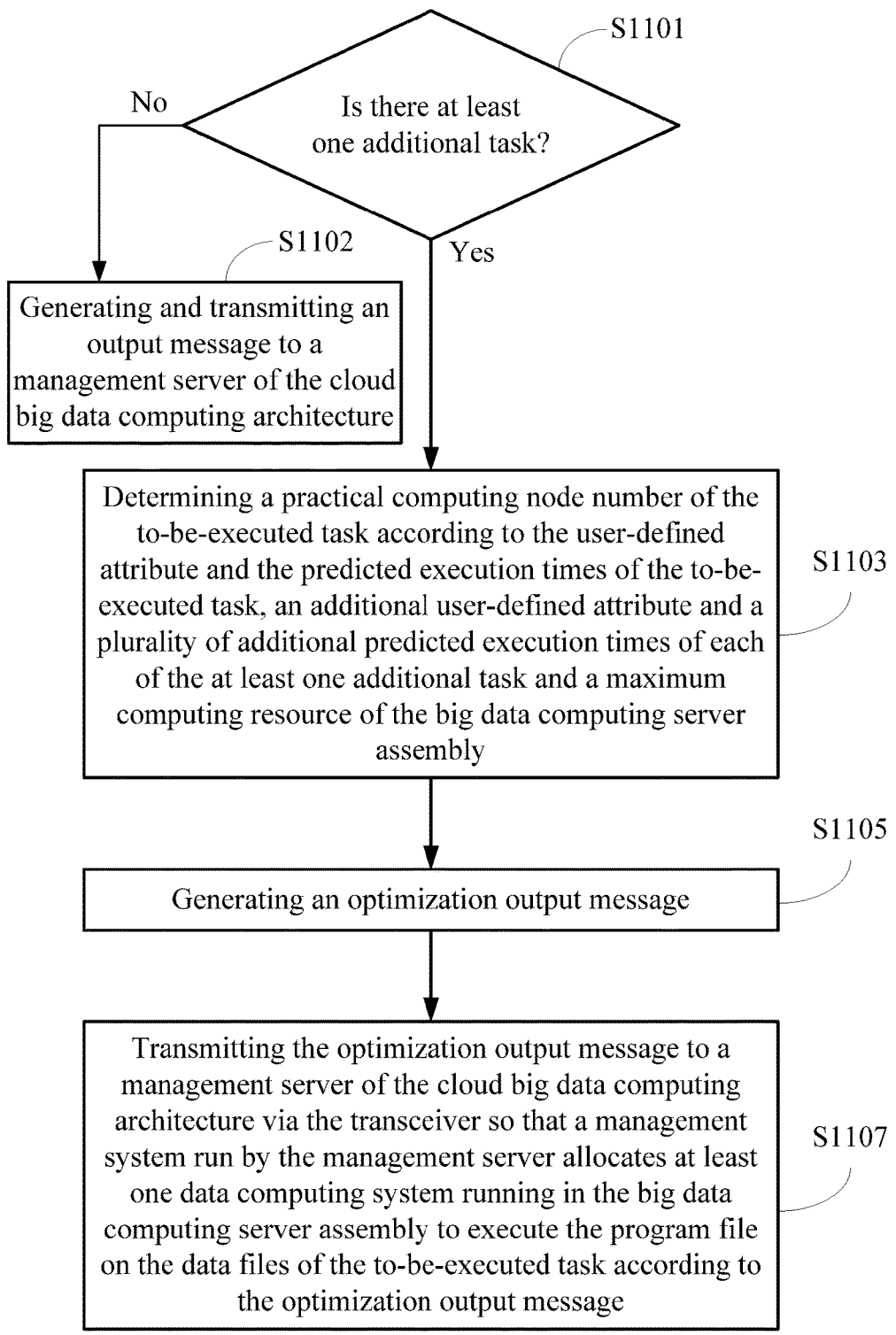

Then in step S709, an optimization procedure is executed. The optimization procedure comprises the steps shown in FIG. 11. In step S1101, it is determined whether there is at least one additional task. Then when the at least one additional task exists, step S1103 is executed to determine a practical computing node number of the to-be-executed task according to the user-defined attribute and the predicted execution times of the to-be-executed task, an additional user-defined attribute and a plurality of additional predicted execution times of each of the at least one additional task, and a maximum computing resource of the big data computing server assembly. Afterwards in step S1105, an optimization output message is generated. The optimization output message records the program file, the data files, the practical computing node number, the computing node type and the system parameter of the to-be-executed task.

Next in step S1107, the optimization output message is transmitted to a management server of the big data cloud computing architecture via the transceiver so that a management system run by the management server allocates at least one data computing system running in the big data computing server assembly to execute the program file on the data files of the to-be-executed task according to the optimization output message. The number of the at least one data computing system is equal to the practical computing node number. On the other hand, when it is determined in the step S1101 that there is no additional task, step S1102 is executed to generate and transmit an output message to a management server of the big data cloud computing architecture. The output message records the program file, the data files, the practical computing node number, the computing node type and the system parameter of the to-be-executed task. In this case, the practical computing node number may be set to be the maximum computing node number recorded in the user-defined attribute, or be set to be the maximum computing node number that can be provided by the maximum computing resource of the big data computing server assembly 2 based on the predetermined system specification.

In other embodiments, the cloud computing resource optimization method further comprises the following step of: determining a file size of the data files of the to-be-executed task before executing the profiling procedure; and executing the profiling procedure if the file size of the data files is greater than a threshold. Additionally, in other embodiments, the cloud computing resource optimization method further comprises the step of executing a monitoring procedure that comprises the following step of: updating the execution time prediction curve of the to-be-executed task when the at least one data computing system is executing the program file of the to-be-executed task.

In an embodiment, the user-defined attribute comprises a task execution priority value, a task deadline time, a minimum computing node number and a maximum computing node number, and the optimization procedure further comprises the following step of calculating a task weight value of the to-be-executed task according to the following formula:

$$V = EP \times \frac{D}{D - WT}$$

where V is the task weight value, EP is the task execution priority value, D is the task deadline time of the to-be-executed task, and WT is an execution waiting time.

The optimization procedure may further comprise the following steps of: determining the practical computing node number of the to-be-executed task according to the task weight value and the predicted execution times of the to-be-executed task, an additional task weight value and the additional predicted execution times of each of the at least one additional task, and the maximum computing resource of the big data computing server assembly; calculating a plurality of ratios between the task weight value of the to-be-executed task and each of the predicted execution times; calculating a plurality of additional ratios between the additional task weight value and each of the additional predicted execution times for each of the at least one additional task; calculating a plurality of sum values between any of the ratios and any of the additional ratios of each of the at least one additional task; selecting the maximum sum value from among the sum values; and setting the practical computing node number to the computing node number that corresponds to the predicted execution time of the ratio contributing to the maximum sum value.

In an embodiment, the optimized output message further records an additional practical computing node number of each of the at least one additional task. The optimization procedure further comprises the following step of: for each of the at least one additional task, setting the additional practical computing node number to the additional computing node number that corresponds to the additional predicted execution time of the additional ratio contributing to the maximum sum value.

In an embodiment, the big data cloud computing architecture further comprises a dynamic scaling data storage system. The dynamic scaling data storage system is configured to store the sampled data files, the profile, the classification model and the prediction model of the to-be-executed task. The profile of the to-be-executed task comprises program file parse data, a sampled task log and a system resource usage record.

In an embodiment, the classification model has a plurality of standard task classifications. The classifying procedure further comprises the following step of: using a clustering algorithm to modify the standard task classifications according to a plurality of historical profiles of a plurality of already executed tasks. In an embodiment, the server further comprises storage configured to store the classification model and the prediction model.

In addition to the aforesaid steps, the cloud computing resource optimization method of the present invention can also execute all the operations and have all the functions set forth in all the previous embodiments. How this embodiment executes these operations and has these functions will be readily appreciated by those of ordinary skill in the art based on the explanation of the previous embodiments, and thus will not be further described herein.

According to the above descriptions, the cloud computing resource optimization method of the present invention runs a dynamic scaling system in a big data cloud computing architecture to perform profile analysis on a to-be-executed task and to classify the to-be-executed task according to the profile analysis result. Then, the cloud computing resource optimization method of the present invention assigns a computing node type and a system parameter of the to-be-executed task and predicts a plurality of predicted execution times of the to-be-executed task corresponding to a plurality of computing node numbers according to the profile analysis result and the classification result.

The dynamic scaling system determines a practical computing node number of the to-be-executed task according to a user-defined attribute and the predicted execution times of the to-be-executed task, an additional user-defined attribute and a plurality of additional predicted execution times of each of at least one additional task and the maximum computing resource of the big data cloud computing architecture, and provides the practical computing node number, the computing node type and the system parameter of the to-be-executed task to a management server of the big data cloud computing architecture so that appropriate computing resources are allocated to the to-be-executed task. Accordingly, the present invention can optimize use of the limited computing resources by automatically allocating computing resources and adding or deleting virtual hosts. Thereby, unfairness in allocation of the limited resources or degradation in overall efficiency of the computing system due to adjustment or setting of the number of virtual hosts and system parameters thereof by the users themselves is avoided.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A server for big data cloud computing architecture, comprising:
a transceiver connected to a network; and
a processor electrically connected to the transceiver, being configured to run a dynamic scaling system to execute the following operations:
receiving a task message via the transceiver, the task message recording a user-defined attribute, a program file and a plurality of data files of a to-be-executed task, the program file and the data files being stored in a data storage system which runs in a data storage server assembly in the big data cloud computing architecture;
executing a profiling procedure that comprises the following steps of:
sampling the data files recorded in the task message to choose a plurality of sampled data files and to generate an advance execution message which records the sampled data files and the program file of the to-be-executed task;
transmitting the advance execution message to a big data computing server assembly of the big data cloud computing architecture via the transceiver so that a sampled data computing system running in the big data computing server assembly executes the program file on the sampled data files and generates a profile according to an execution result of the program file; and
receiving the profile from the big data computing server assembly via the transceiver;
executing a classifying procedure that comprises the following step of:
based on a classification model, comparing the profile with the classification model to determine a task classification of the to-be-executed task;
executing a prediction procedure that comprises the following steps of:
based on a computing node type and a system parameter recorded in a prediction sub-model corresponding to the task classification in a prediction model, assigning the computing node type and the system parameter to the to-be-executed task; and
based on the prediction sub-model, generating an execution time prediction curve of the to-be-executed task according to the task classification and the profile to obtain a plurality of predicted execution times of the to-be-executed task corresponding to a plurality of computing node numbers, the computing node numbers corresponding to the predicted execution times in one-to-one correspondence;
executing an optimization procedure that comprises the following steps of:
determining whether there is at least one additional task;
when the at least one additional task exists, determining a practical computing node number of the to-be-executed task according to the user-defined attribute and the predicted execution times of the to-be-executed task, an additional user-defined attribute and a plurality of additional predicted execution times of each of the at least one additional task, and a maximum computing resource of the big data computing server assembly;
generating an optimization output message, which records the program file, the data files, the practical computing node number, the computing node type and the system parameter of the to-be-executed task; and
transmitting the optimization output message to a management server of the big data cloud computing architecture via the transceiver so that a management system run by the management server allocates at least one data computing system running in the big data computing server assembly to execute the program file on the data files of the to-be-executed task according to the optimization output message, wherein the number of the at least one data computing system is equal to the practical computing node number.

2. The server of claim 1, wherein the processor further executes a monitoring procedure that comprises the following step of:
updating the execution time prediction curve of the to-be-executed task when the at least one data computing system is executing the program file of the to-be-executed task.

3. The server of claim 1, wherein the processor further determines a file size of the data files of the to-be-executed task before executing the profiling procedure, and executes the profiling procedure if the file size of the data files is greater than a threshold.

4. The server of claim 1, wherein the user-defined attribute comprises a task execution priority value, a task deadline time, a minimum computing node number and a maximum computing node number, and the optimization procedure further comprises the following step of:
calculating a task weight value of the to-be-executed task according to the following formula:

$$V = EP \times \frac{D}{D - WT}$$

where V is the task weight value, EP is the task execution priority value, D is the task deadline time of the to-be-executed task, and WT is an execution waiting time.

5. The server of claim 4, wherein the processor determines the practical computing node number of the to-be-executed task in the optimization procedure according to the task weight value and the predicted execution times of the to-be-executed task, an additional task weight value and the additional predicted execution times of each of the at least one additional task, and the maximum computing resource of the big data computing server assembly.

6. The server of claim 5, wherein the optimization procedure further comprises the following steps of:
calculating a plurality of ratios between the task weight value of the to-be-executed task and each of the predicted execution times;
calculating a plurality of additional ratios between the additional task weight value and each of the additional predicted execution times for each of the at least one additional task;
calculating a plurality of sum values between any of the ratios and any of the additional ratios of each of the at least one additional task;
selecting the maximum sum value from among the sum values; and setting the practical computing node number to the computing node number which corresponds to the predicted execution time of the ratio contributing to the maximum sum value.

7. The server of claim 6, wherein the optimization output message further records an additional practical computing node number of each of the at least one additional task, and the optimization procedure further comprises the following step of:
for each of the at least one additional task, setting the additional practical computing node number to the additional computing node number which corresponds to the additional predicted execution time of the additional ratio contributing to the maximum sum value.

8. The server of claim 1, wherein the data storage server assembly further runs a dynamic scaling data storage system, and the dynamic scaling data storage system is configured to store the sampled data files, the profile, the classification model and the prediction model of the to-be-executed task.

9. The server of claim 1, wherein the profile of the to-be-executed task comprises program file parse data, a sampled task log and a system resource usage record.

10. The server of claim 1, wherein the classification model has a plurality of standard task classifications, and the processor further uses a clustering algorithm to modify the standard task classifications according to a plurality of historical profiles of a plurality of already executed tasks.

11. The server of claim 1, further comprising storage configured to store the classification model and the prediction model.

12. A cloud computing resource optimization method of a server for big data cloud computing architecture, the server comprising a transceiver and a processor, the transceiver being connected to a network, and the processor being electrically connected to the transceiver to run a dynamic scaling system to execute the cloud computing resource optimization method, the cloud computing resource optimization method comprising:
receiving a task message via the transceiver, the task message recording a user-defined attribute, a program file and a plurality of data files of a to-be-executed task, the program file and the data files being stored in a data storage server assembly in the big data cloud computing architecture;
executing a profiling procedure that comprises the following steps of:
sampling the data files recorded in the task message to choose a plurality of sampled data files and to generate an advance execution message which records the sampled data files and the program file of the to-be-executed task;
transmitting the advance execution message to a big data computing server assembly of the big data cloud computing architecture via the transceiver so that a sampled data computing system running in the big data computing server assembly executes the program file on the sampled data files and generates a profile according to an execution result of the program file; and
receiving the profile from the big data computing server assembly via the transceiver;
executing a classifying procedure that comprises the following step of:
based on a classification model, comparing the profile with the classification model to determine a task classification of the to-be-executed task;

executing a prediction procedure that comprises the following steps of:
based on a computing node type and a system parameter recorded in a prediction sub-model corresponding to the task classification in a prediction model, assigning the computing node type and the system parameter to the to-be-executed task; and
based on the prediction sub-model, generating an execution time prediction curve of the to-be-executed task according to the task classification and the profile to obtain a plurality of predicted execution times of the to-be-executed task corresponding to a plurality of computing node numbers, the computing node numbers corresponding to the predicted execution times in one-to-one correspondence;
executing an optimization procedure that comprises the following steps of:
determining whether there is at least one additional task;
when the at least one additional task exists, determining a practical computing node number of the to-be-executed task according to the user-defined attribute and the predicted execution times of the to-be-executed task, an additional user-defined attribute and a plurality of additional predicted execution times of each of the at least one additional task, and a maximum computing resource of the big data computing server assembly;
generating an optimization output message, which records the program file, the data files, the practical computing node number, the computing node type and the system parameter of the to-be-executed task; and
transmitting the optimization output message to a management server of the big data cloud computing architecture via the transceiver so that a management system run by the management server allocates at least one data computing system running in the big data computing server assembly to execute the program file on the data files of the to-be-executed task according to the optimization output message, wherein the number of the at least one data computing system is equal to the practical computing node number.

13. The cloud computing resource optimization method of claim 12, further comprising:
updating the execution time prediction curve of the to-be-executed task when the at least one data computing system is executing the program file of the to-be-executed task.

14. The cloud computing resource optimization method of claim 12, further comprising:
determining a file size of the data files of the to-be-executed task; and
executing the profiling procedure if the file size of the data files is greater than a threshold.

15. The cloud computing resource optimization method of claim 12, wherein the user-defined attribute comprises a task execution priority value, a task deadline time, a minimum computing node number and a maximum computing node number, and the optimization procedure further comprises:
calculating a task weight value of the to-be-executed task according to the following formula:

$$V = EP \times \frac{D}{D - WT}$$

where V is the task weight value, EP is the task execution priority value, D is the task deadline time of the to-be-executed task, and WT is an execution waiting time.

16. The cloud computing resource optimization method of claim 15, wherein the optimization procedure further comprises:

determining the practical computing node number of the to-be-executed task according to the task weight value and the predicted execution times of the to-be-executed task, an additional task weight value and the additional predicted execution times of each of the at least one additional task, and the maximum computing resource of the big data computing server assembly.

17. The cloud computing resource optimization method of claim 16, wherein the optimization procedure further comprises:

calculating a plurality of ratios between the task weight value of the to-be-executed task and each of the predicted execution times;

calculating a plurality of additional ratios between the additional task weight value and each of the additional predicted execution times for each of the at least one additional task;

calculating a plurality of sum values between any of the ratios and any of the additional ratios of each of the at least one additional task;

selecting the maximum sum value from among the sum values; and setting the practical computing node number to the computing node number which corresponds to the predicted execution time of the ratio contributing to the maximum sum value.

18. The cloud computing resource optimization method of claim 17, wherein the optimization output message further records an additional practical computing node number of each of the at least one additional task, and the optimization procedure further comprises:

for each of the at least one additional task, setting the additional practical computing node number to the additional computing node number which corresponds to the additional predicted execution time of the additional ratio contributing to the maximum sum value.

19. The cloud computing resource optimization method of claim 12, wherein the big data cloud computing architecture further comprises a dynamic scaling data storage system, and the dynamic scaling data storage system is configured to store the sampled data files, the profile, the classification model and the prediction model of the to-be-executed task.

20. The cloud computing resource optimization method of claim 12, wherein the profile of the to-be-executed task comprises program file parse data, a sampled task log and a system resource usage record.

21. The cloud computing resource optimization method of claim 12, wherein the classification model has a plurality of standard task classifications, and the classifying procedure further comprises:

using a clustering algorithm to modify the standard task classifications according to a plurality of historical profiles of a plurality of already executed tasks.

22. The cloud computing resource optimization method of claim 12, wherein the server further comprises storage configured to store the classification model and the prediction model.

* * * * *